United States Patent
Abert (10) Patent No.: US 9,811,944 B2
(45) Date of Patent: Nov. 7, 2017

(54) METHOD FOR VISUALIZING FREEFORM SURFACES BY MEANS OF RAY TRACING

(75) Inventor: Oliver Abert, Koblenz (DE)

(73) Assignee: AUTODESK, INC., San Rafael, CA (US)

(*) Notice: Subject to any disclaimer, the term of this patent is extended or adjusted under 35 U.S.C. 154(b) by 660 days.

(21) Appl. No.: 13/436,571

(22) Filed: Mar. 30, 2012

(65) Prior Publication Data

US 2012/0249742 A1 Oct. 4, 2012

(30) Foreign Application Priority Data

Apr. 1, 2011 (DE) .................. 10 2011 015 893

(51) Int. Cl.
| | | |
|---|---|---|
| *G06T 17/00* | (2006.01) | |
| *G06T 11/20* | (2006.01) | |
| *G06T 15/06* | (2011.01) | |
| *G06T 17/30* | (2006.01) | |
| *G06T 17/20* | (2006.01) | |

(52) U.S. Cl.
CPC .......... *G06T 17/005* (2013.01); *G06T 11/203* (2013.01); *G06T 15/06* (2013.01); *G06T 17/20* (2013.01); *G06T 17/30* (2013.01)

(58) Field of Classification Search
CPC ..... G06T 11/203; G06T 15/06; G06T 17/005; G06T 17/20; G06T 17/30
See application file for complete search history.

(56) References Cited

U.S. PATENT DOCUMENTS

| | | | |
|---|---|---|---|
| 2003/0038811 A1* | 2/2003 | Gritz ................. | G06F 17/3028 345/581 |
| 2005/0231508 A1* | 10/2005 | Christensen et al. ......... | 345/428 |
| 2006/0155418 A1* | 7/2006 | Bradbury et al. ............ | 700/182 |
| 2008/0049018 A1* | 2/2008 | Sfarti ........................... | 345/423 |
| 2009/0167763 A1* | 7/2009 | Waechter ............... | G06T 15/06 345/426 |
| 2010/0289799 A1* | 11/2010 | Hanika ................... | G06T 15/06 345/421 |

OTHER PUBLICATIONS

O. Abert, M. Geimer, & S. Müller, "Direct and Fast Ray Tracing of NURBS Surfaces", 2006 IEEE Symposium on Interactive Ray Tracing 161-168 (Sep. 2006).*

(Continued)

*Primary Examiner* — David N Werner
(74) *Attorney, Agent, or Firm* — Artegis Law Group, LLP (57) ABSTRACT

The invention relates to visualizing freeform surfaces, like NURBS surfaces, from three-dimensional construction data via Virtual beams from a virtual camera are sent out of a virtual image plane in a scene having at least one object and at least one freeform surface. Lighting values are calculated for each point where a beam intersects the freeform surface. The lighting values are then attributed to the pixels associated with the different points of intersection. The freeform surface is defined by two parameters (u, v), and related equations define all points of the surface of the freeform surface The subdivision of the freeform surface for determining the intersections with the beams based on the two parameters (u, v) is regular, so that the surface fragments form meshes of a two-dimensional grid of the freeform surface in the parameter space.

15 Claims, 7 Drawing Sheets

(56) References Cited

OTHER PUBLICATIONS

A. Efremov, "Efficient Ray Tracing of Trimmed NURBS Surfaces", University of Saarland, Jan. 2010.*

J. Bärz, O. Abert, & S. Müller, "Interactive particle tracing in dynamic scenes consisting of NURBS surfaces", 2008 IEEE Symposium on Interactive Ray Tracing 139-146 (Aug. 2008).*

W. Martin, E. Cohen, R. Fish, & P. Shirley, "Practical Ray Tracing of Trimmed NURBS Surfaces" 5 J. of Graphics Tools 27-52 (2000).*

Deutsches Patent-und Markenamt, Register Excerpt for corresponding German Application 10 2011 015 893.6 (Feb. 27, 2014).*

Michael Guthe, "Appearance Preserving Rendering of Out-of-Core Polygon and NURBS Models", University of Bonn (Mar. 31, 2005).*

S. Kuma, D. Manocha, & A. Lastra, "Interactive Display of Large NURBS Models", 2 IEEE Transactions on Visualization & Computer Graphics 323-336 (Dec. 1996).*

M. Guthe, Á Balázs, & R. Klein, "GPU-based trimming and tessellation of NURBS and T-Spline surfaces", 24 ACM Transaction on Graphics 1016-1023 (2005).*

H.T. Yau, Y.K. Lin, & C.T. Yeh, "A New Approach to Accelerate NURBS Surface Rendering on GPU", 6 Computer-Aided Design & Applications 529-538 (2009).*

D.L. Toth, "On Ray Tracing Parametric Surfaces", 19 ACM SIGGRAPH Comp. Graphics 171-179 (Jul. 1985).*

M.A.J Sweeney & R.H. Bartels, "Ray Tracing Free-Form B-Spline Surfaces", 6 IEEE Comp. Graphics & Applications 41-49 (Feb. 1986).*

G. Yu, "Piecewise Surface Reconstruction from Range Data", City University of New York (2010).*

S. Kumar & D. Manocha, "Interactive Display of Large NURBS Models", 2 IEEE Transactions on Visualization & Comp. Graphics 323-336 (Dec. 1996).*

A. Krishnamurthy, R. Khardekar, S. McMains, K. Haller, & G. Elber, "Performing Efficient NURBS Modeling Operations on the GPU", 15 IEEE Transactions on Visualization & Comp. Graphics 530-543 (Aug. 2009).*

D. L. Toth, "On Ray Tracing Parametric Surfaces", 19 ACM SIGGRAPH Comp. Graphics 171-179 (1985).*

"VRED Professional" software by PI-VR, Robert-Bosch-Stralle 7, 64293 Darmstadt, Germany.

Balázs, et al., "Efficient trimmed NURBS tessellation", Journal of WSCG, Feb. 2004, pp. 27-33.

Glassner, "An Introduction to Ray Tracing": Morgan Kaufmann, 1989.

Martin, et al., "Practical Ray Tracing of Trimmed NURBS Surfaces", Journal of Graphics Tools, vol. 5, No. 1, 2000, 17 pages.

Rogers, "An Introduction to NURBS with Historical Perspective", Morgan Kaufmann Publishers, 2001, ISBN 1558606696.

Whitted, "An Improved Illumination Model for Shaded Display", Communications of the ACM, vol. 23, No. 6, Jun. 1980, pp. 343-349.

Shirley, P. (2000), "Realistic Ray Tracing": A K Peters.

O. Abert, 2009, "Augenblick-Ein effizientes Framework fur Echtzeit Ray Tracing" ["Snapshot—an efficient framework for real-time ray tracing"], EUL Verlag [publishers], ISBN 978-3-89936-847-5.

* cited by examiner

METHOD FOR VISUALIZING FREEFORM SURFACES BY MEANS OF RAY TRACING

CROSS-REFERENCE TO RELATED APPLICATIONS

This application claims priority to German Patent Application No. 10 2011 015 893.6, filed Apr. 1, 2011, hereby incorporated herein by reference.

SUMMARY OF THE INVENTION

The invention relates to a method for visualizing freeform surfaces, more particularly NURBS surfaces, on a computer system from three-dimensional construction data by means of ray tracing, in which virtual beams are emitted into a scene from a virtual camera through respectively one pixel in a virtual image plane, which scene comprises at least one object with at least one freeform surface, and in which the intersection between each beam and the freeform surface is calculated and illumination values at these intersections are assigned to the pixels in the image plane, wherein the freeform surface is defined by an equation that is dependent on two parameters and describes all points on the surface of the freeform surface by inserting values for the parameters, and the freeform surface is subdivided into a number of surface fragments for calculating the intersection, which surface fragments are each enclosed by at least one bounding box. Moreover, the invention relates to a computer program with instructions for carrying out the method according to the invention if it is executed on a computer system, and to a data medium with such a computer program, the instructions of which can be loaded onto a computer system from the data medium and can be executed on said computer system.

Computational visualistics relates to image synthesis methods that allow the rendering of very complex construction data records, in particular computer aided design (CAD) data records, for example from the field of automotive, ship or aeroplane design. Scientific visualizations, industrial applications, impressive effects in films and overwhelming computer-game graphics all profit from the rapid developments in this field over the past two decades. There has been a drastic increase in both the image quality and the speed of image generation as a result of ever-faster hardware and improved algorithms. Nevertheless, a compromise between realism and calculation time of the simulation, i.e. the duration of the image calculation until said image is displayed, must often still be made, even these days. Here, an important role is played by the quality of the rendering, which, depending on application, is measured by the degree of realism achieved or else by the achieved aesthetic impression of the viewer.

Three different visualization methods are established in the prior art: the so-called rasterization methods, the so-called radiosity method and the so-called ray tracing. Rasterization only offers a lower quality at higher speeds than ray-tracing approaches. As a result of these characteristics, computer games and many further real-time applications are usually calculated by means of rasterization, while high-quality visualizations for film or advertisement are generated by ray tracing. This is largely based on the fact that physically plausible or correct simulations of shadows, refractions and similar light effects can only be simulated correctly by methods based on ray tracing. A further unique characteristic is the option of being able to use geometries represented in an arbitrary fashion, provided that it is possible to calculate an intersection with a beam. In contrast thereto, rasterization methods only use triangles as a basic geometric shape, which shapes are called primitives, while ray tracing can use any type of geometric primitive. Even so-called non-uniform relative B-spline (NURBS) surfaces, which are widely used in industry, can be visualized efficiently using the ray tracing method. A detailed scientific description of NURBS surfaces is provided in the book by David F. Rogers, "An Introduction to NURBS with Historical Perspective", Morgan Kaufmann, 2001, ISBN 1558606696.

In rasterization, a so-called tessellation of freeform surfaces is carried out, see e.g. Balazs, A, Guthe, M and Klein, R. (2004) in "Efficient trimmed NURBS tessellation", Journal of WSCG. pp. 27-33, in which the freeform surfaces are first of all subdivided into a relatively large number of triangles before rendering. This approximates the freeform surface. However, this approximation is ever more error-prone as the number of triangles used to approximate the surface decreases. It is for this reason that a large number of triangles are usually desirable. However, this also harbours problems in respect of the execution speed and memory usage. Previous direct approaches that avoid tessellation either have not left the research stage as a result of technical obstacles or have until now not been able to find widespread use because the memory usage was found to be too great in many industrial applications. This memory problem can be overcome by the invention described here, even in the case of complex data records.

The ray-tracing method is an image-synthesis method that calculates a two-dimensional projection, i.e. an "image", from a virtual three-dimensional scene. Ray tracing is used in many areas of image synthesis, be it in the photorealistic visualization of vehicles or furniture, and right up to computer-animated cinema movies. Here, triangles or other simple primitives such as spheres or cylinders are used as geometry in almost all cases. In contrast to rasterization approaches by means of the graphics card, e.g. in computer games, ray tracing allows correct simulation of very complex physical effects. In respect of detailed information relating to the ray-tracing method for the purpose of understanding it, reference is made to the following books: Glassner, A. (1989), "An Introduction to Ray Tracing": Morgan Kaufmann and Shirley, P. (2000), "Realistic Ray Tracing": A K Peters.

Figure 1:
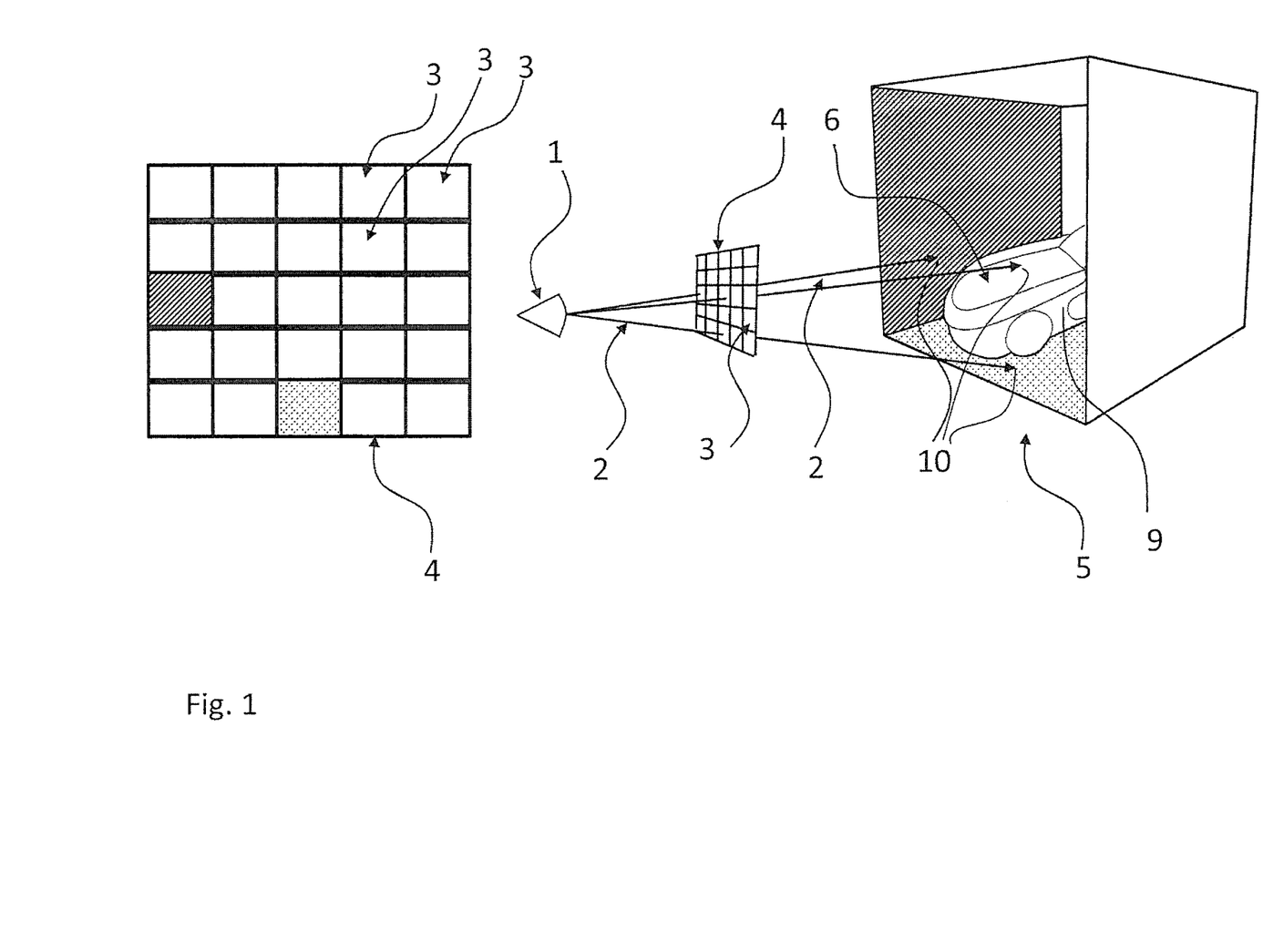
FIG. 1 shows a schematic illustration of the ray tracing principle.

In ray tracing, an image is calculated, starting from a virtual camera 1, geometric objects and light sources of a virtual 3D scene 5, see FIG. 1. This is brought about by emitting beams 2 from the camera 1 into the scene 5 though a virtual image plane 4 and by calculating the intersections 10 with the geometric objects. At such intersections 10, the color is calculated, dependent on the light sources, from illumination information, which color the camera 1 registers at the pierced pixel 3 in the virtual image plane 4. To be precise, this is merely a "ray-casting" method because the beams 2 already terminate after the first intersection 10 with the scene 5. Strictly speaking, it would be necessary to calculate the amount of incident light that passes through each pixel 3, i.e. through each pixel in the virtual image plane 4. However, under the assumption that such a pixel 3 is relatively small, a beam 2 is actually used in place of a frustum of a pyramid in order to simplify the calculations. This is insufficient for simulating effects like a reflection. To this end, use is made of recursive methods, in which the beam tracing is carried out backwards, see Whitted, T. (1980), An Improved Illumination Model for Shaded Display, Communications of the ACM, 23(6), 343-349. In the case of the beams emitted from the camera 1 into the scene, the so-called primary beams, the material of an impinged surface is then also taken into account, i.e. whether said material is reflective or transmissive, which may optionally lead to the generation of further beams for reflected or refracted light paths, so-called secondary beams. By taking the results of the recursively emitted secondary beams into account, the color of the pixel then is determined, and so an image rendering is achieved that is more realistic.

One of the most important operations in ray tracing is the intersection calculation between a beam and a geometry in the scene. Since the intersection calculation between beam and freeform surface is very complex and hence very expensive in computational terms, use is made of so-called approximating Bezier surfaces in almost all cases as a simple type of freeform surface that likewise, i.e. like the triangles as well, does not use the original, unmodified data records, which prevents direct processing on the monitor on the basis of the illustrated visualization.

In the commercial environment, there is only a single solution worldwide that allows the intersection calculation between a beam and a NURBS surface. This solution was developed by the applicant and constitutes an extension of the "VRED Professional" software by PI-VR, Robert-Bosch-Straße 7, 64293 Darmstadt, Germany. Experience from using this solution has shown that a buffer of more than 32 GB is often required for real data records from industry. Equipping a multiplicity of computers at appropriate workstations with this amount of main memory is uneconomical. For example, upgrading a computer network consisting of 1024 nodes by respectively 32 GB main memory quickly requires more than a quarter of a million Euros.

In order to calculate the intersection, use can be made of a Newton-iteration method, as described in Martin, W., Cohen, E., Fish, R., and Shirley, P. (2000), "Practical Ray Tracing of Trimmed NURBS Surfaces", Journal of Graphics Tools: JGT 5(1), 27-52, in order to approximate numerically the intersection between freeform surface and beam. Iterative methods attempt to approximate a solution in a number of steps. Newton's method is one of the best known exponents of this class. Although a quick runtime is by no means guaranteed, iterative methods nevertheless can often achieve great speed advantages over other methods. However, a disadvantage is that initial values are required for starting the iteration and ensuring a reliable convergence. Depending on the application, such an initial value must lie extraordinarily close to the actual solution. It is therefore mandatory to establish good initial values that are used to start this iteration.

The previously most efficient solution is based on work by the applicant, which is described in the book by O. Abert, 2009, "Augenblick-Ein effizientes Framework fur Echtzeit Ray Tracing" ["Snapshot—an efficient framework for real-time ray tracing"], EUL Verlag [publishers], ISBN 978-3-89936-847-5. With this, reference is fully made to this book and the contents thereof are included in the contents of this patent application by reference. In the cited solution, the parametric two-dimensional domain of the freeform surface is decomposed into regions such that these regions define surface fragments of the freeform surface that are almost planar for the parameter-ranges, defined by the boundaries of a region, in three-dimensional space. It follows that the regions in the parameter space correspond to surface fragments in 3D space, which are known as such as per the English terminology.

The determination of the precise positions of the surface fragments on the freeform surface, i.e. the precise subdivision of the freeform surface, is brought about by a "normal criterion", see O. Abert, 2009, "Augenblick—Ein effizientes Framework fur Echtzeit Ray Tracing" ["Snapshot—an efficient framework for real-time ray tracing"], EUL Verlag [publishers], ISBN 978-3-89936-847-5, pages 142 ff., which scans the surface at specific points and compares the normals thereof in order to determine whether the surface has strong curvature or is rather flatter. If the curvature is above a definable threshold, the region is subdivided into two new sub-regions and the method is applied recursively.

Figure 2:
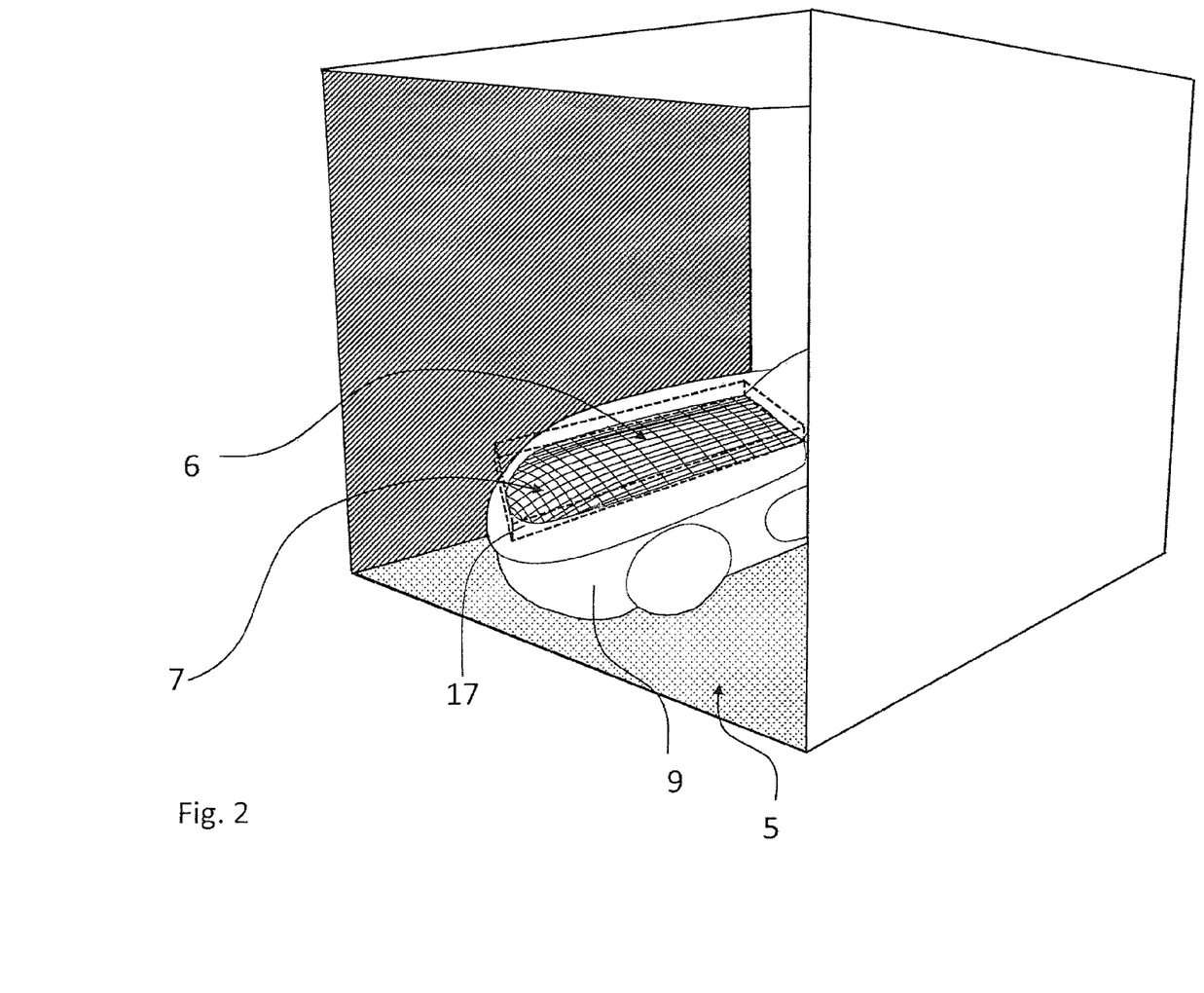
FIG. 2 shows the rendering of an object with a NURBS surface subdivided into surface fragments.

The subdivision always takes place at the parametric centre of the respective parametric direction that has a greater extent in Cartesian space. In end effect, this generates an irregular subdivision of the parametric space of each freeform surface, spanned by the two parameter directions. Such an irregular subdivision is illustrated in FIG. 2. A surface fragment is described by a data structure that requires 64 bytes of memory. There are often of the order of millions of these surface fragments in a scene, and so the memory requirements are correspondingly large. These surface fragments are used to build a so-called acceleration data structure so that it is possible to quickly determine the surface fragment within which the freeform surface is intersected by a beam. As a result of the acceleration data structure it is unnecessary to subject each surface fragment to an intersection test. Rather, the number of intersection tests can be reduced by the acceleration data structure.

Here, a bounding box is placed around each surface fragment such that each bounding box completely encloses a corresponding surface fragment. These bounding boxes are ordered in a hierarchy. This means that at least two bounding boxes are enclosed by a superior bounding box, which in turn is inside a superior bounding box with at least one other bounding box.

The hierarchy emerges automatically when dividing the parametric two-dimensional domain of the freeform surface into approximately planar regions, i.e. into planar surface fragments. If a surface fragment is determined not to be approximately planar, it is further subdivided such that two new surface fragments are created. According to the hierarchy, the bounding boxes respectively enclosing these two new surface fragments form children of the bounding box that encloses the original surface fragment.

The bounding boxes can for example be embodied as three-dimensional cuboids, the sides of which are parallel to the axes of the Cartesian coordinate system of the scene. Such a bounding box—this is the terminology used in the art—mathematically allows a quick determination of whether or not a bounding box is impinged by a beam from the virtual camera. If it is not impinged, the bounding boxes and the enclosed surface fragments contained therein need not be tested in respect of an intersection. As per the prior art, use is made of a data structure requiring 32 bytes in order to store the bounding box. In actual fact, the storage requirement is (2*<number of surface fragments>+1)*32 bytes. Since several million surface fragments including associated bounding boxes are often required in a scene in order to achieve good image quality on the basis of industrial applications, the intersection calculations for a scene lead to a memory requirement of several gigabytes.

It is therefore an object of the present invention to provide a method in which the memory requirement for visualizing freeform surfaces is markedly reduced, without a significant deterioration in the execution speed or the output quality, wherein the investment costs for the memory equipment of the hardware required to calculate the visualization should simultaneously be minimized.

This object is achieved by the method with the features of claim 1. Advantageous developments of the method are specified in the dependent claims.

According to the invention, a method for visualizing freeform surfaces, more particularly NURBS surfaces, on a computer system from three-dimensional construction data by means of ray tracing is proposed, in which virtual beams are emitted into a scene from a virtual camera through respectively one pixel in a virtual image plane, which scene comprises at least one object with at least one freeform surface, and in which the intersection between each beam and the freeform surface is calculated and illumination values at these intersections are assigned to the pixels in the image plane, wherein the freeform surface is defined by an equation that is dependent on two parameters and describes all points on the surface of the freeform surface by inserting values for the parameters, and the freeform surface is subdivided into a number of surface fragments for calculating the intersection, which surface fragments are each enclosed by at least one bounding box, and wherein the subdivision in the direction of the two parameters is regular such that the surface fragments form meshes of a two-dimensional grid of the freeform surface.

This method allows the rendering—this is the term in the art—of very complex CAD data records in very quick time on commercially available hardware. On the one hand, this allows time of the order of many hours to be saved in each visualization process; on the other hand, the method means that there no longer is the need for the acquisition and use of expensive specialized hardware or large numbers of networked computers, so-called "clusters", for calculating the visualization.

In this context, a visualization process describes the transfer into a triangle representation ("triangulation"), which was previously mandatory for rendering, the preparation of this newly generated data record, which is simultaneously connected thereto, and the loading and rendering of precisely this data record. As a result of the invention presented here, acquisition costs for the hardware can either be avoided because commonly available 16 to 32 GB main memory suffices or else rendering of very complex three-dimensional data records on conventional computer systems is made possible by the invention in the first place. The method according to the invention even allows a high-quality simulation of freeform surfaces of arbitrarily complex scenes in real time.

The invention preferably serves for rendering NURBS surfaces, wherein, however, freeform surfaces that are simpler in terms of their mathematical description, for example Bezier surfaces or so-called B-splines, can also be visualized by the method according to the invention. This type of freeform surface is described mathematically in a parameter representation by two parameters u, v such that if these parameters are inserted into the equation describing the freeform surface, a point on the surface of the freeform surface is calculated in the three-dimensional coordinate system in which the freeform surface is situated. Hence the freeform surface is also referred to as a parametric freeform surface. The parameters u, v form coordinates of a two-dimensional parameter space, which is also referred to as a parametric domain. The extent of the surface is uniquely defined and finite by limiting the range for the parameters.

According to the invention, a proposition is now made to undertake a regular subdivision of the freeform surface into surface fragments in the direction of the two parameters. On the one hand, this means that the regular subdivision is mathematically effected in the parameter space (u, v) and not in the three-dimensional space (x, y, z). Thus, this may also be referred to as a parametric subdivision. The undertaken subdivision may then turn out to be irregular in 3D space. On the other hand, this means that the parameter directions u, v are, within their respective ranges, respectively subdivided equidistantly, i.e. divided into a number of sections with the same length, such that the surface fragments form meshes of a two-dimensional grid of the freeform surface in the parameter space. However, in the process, the length of the sections in the one parameter direction u may differ from the length of the sections in the other parameter direction v. It follows that the irregular subdivision, as undertaken in the prior art on the basis of the selection of the surface fragments in respect of the curvature thereof, has been abandoned in favor of a regular subdivision.

This approach overall tends to require a greater number of surface fragments in absolute terms because sufficiently planar surface fragments have to be ensured for the intersection calculation; this is ensured by sufficiently small surface fragments. Nevertheless, the achieved memory advantage is huge and justifies this procedure. This results in the advantage that the memory requirement for the surface fragments is significantly reduced. This is because, as a result of their position in the grid, they are uniquely identified or identifiable as a mesh and the parameter boundaries resulting therefrom. The points in the 3D space described thereby can be uniquely calculated from their position in the grid as a result of the respective parameter boundaries of a mesh. Thus, merely two grid coordinates specifying the position of the mesh in the grid are required for referencing a surface fragment. By way of example, the grid coordinates can be stored as full integer values, which merely require 4 bytes of memory, and so a total of only 8 bytes is required for both grid coordinates.

It is particularly advantageous for the position of a surface fragment in the grid to be stored in a data structure as grid coordinates in the direction of the two parameters, which data structure is provided for storing a bounding box that encloses the surface fragment. This removes the necessity of separate storage of the surface fragments, i.e. no additional memory is required for the surface fragments themselves at a corresponding address in the main memory.

It is particularly advantageous to store the grid coordinates in the data structure in an 8, 9, 10, 11 or 12 bit representation. Such a representation requires less memory than one or two integer values for the grid coordinates. By way of example, if the two parameter directions are respectively divided into 1024 section, both the grid coordinate x in the first parameter direction u and the grid coordinate y in the other parameter direction v can be represented by 10 bits, i.e. 10 binary values, in each case saving additionally 22 bits of memory compared to an integer value. If there is a subdivision into 512 sections, respectively 9 bits in principle suffice for specifying the grid coordinates. 11 bits have to be used in each case for a subdivision into 2048 parts. However, it was found in practice that a parametric subdivision of 1024×1024 is completely sufficient for obtaining a high image quality.

The number of bits can preferably be fixed independently of the degree of the actual subdivision. This is because it is expedient to provide at least 10 bits or 12 bits of memory in each case, independently of the size of the actually selected subdivision, with not all bits then being used in the case of a subdivision into less than 1024 sections. Thus, for example, it is possible that 10 bits are provided in each case but, nonetheless, a subdivision of 512×512 is selected, with one bit always remaining unused.

Reference is once again made to the fact that the two parameter directions need not necessarily be subdivided equally. Rather, use can also be made of an unequal subdivision, e.g. 512×1024. Accordingly, it is possible to use different numbers of bits for the two coordinates. However, for performance reasons, the same number of bits should be used for both grid coordinates, i.e. for example 10 bits for the x grid coordinate in the u direction and 10 bits for the y coordinate in the v direction.

Furthermore, it should be noted that the subdivision need not be in sections whose number corresponds to the number to the power two. Rather, any other subdivision may also be undertaken, for example 800×800.

The use of a data structure for the bounding boxes, which data structure simultaneously contains specifications that uniquely identify and allow calculation of a surface fragment surrounded by the bounding box, is significantly less memory-intensive than previous methods and, at the same time, is faster in execution, while the same level of high image quality is maintained. This development for the first time allows the industry and other users to carry out a visualization directly from complex CAD data records, without needing to carry out the previously necessary and time-consuming "tessellation".

A bounding box is preferably stored in a data structure having a number of bytes that is divisible by 16. This is advantageous for memory alignment because the arrangement in terms of addresses divisible by 16 in the main memory leads to efficient cache handling. The data structure preferably comprises 32 bytes. The advantage of this lies in the fact that all information describing the bounding box and, additionally, the grid coordinates can be stored in the data structure. Thus, the data structure may comprise the minimum values x_min, y_min and z_min of the bounding box and its maximum values x_max, y_max, z_max in 3D space, wherein each value can be specified by a 4 byte floating point number, and the grid coordinates y, z in each case as e.g. a 10 bit representation.

A hierarchic acceleration data structure may be placed over the bounding box, as described in O. Abert, 2009, "Augenblick—Ein effizientes Framework fur Echtzeit Ray Tracing" ["Snapshot—an efficient framework for real-time ray tracing"], EUL Verlag [publishers], ISBN 978-3-89936-847-5, pages 50 ff. Here those bounding boxes, called leaf nodes below, that only enclose a single surface fragment are respectively surrounded by other, superior bounding boxes, called inner nodes below, with a distinction being made from a software-technical point of view between these leaf nodes and inner nodes. Leaf nodes are situated at the end of the hierarchy and have no children. By contrast, inner nodes have children. As a result of only the leaf nodes enclosing precisely one surface fragment, it is advantageous if only the data structure describing these leaf nodes contains the grid coordinates of the corresponding surface fragment. By contrast, the inner nodes do not require these grid coordinates. Rather, they require a so-called offset as a pointer to the memory address at which the first child can be found, with children always being adjacent in the memory. In order to ensure uniform memory handling, it is proposed to use the aforementioned data structure uniformly for storing all bounding boxes. This means that the length and configuration of the data structure is the same for all bounding boxes in the acceleration data structure, i.e. for both the leaf nodes and for the inner nodes. Accordingly, the offset is unused, i.e. empty, in the case of leaf nodes and the 2×10 bits for the grid coordinates are unused in the case of inner nodes. Equal treatment of the data structures ensures high performance when accessing and storing the bounding boxes.

A multidimensional Newton-iteration method can be used for numerical calculation of the intersection of a beam with the freeform surface, as described in O. Abert, 2009, "Augenblick—Ein effizientes Framework fur Echtzeit Ray Tracing" ["Snapshot—an efficient framework for real-time ray tracing"], EUL Verlag [publishers], ISBN 978-3-89936-847-5, pages 140 ff. As previously mentioned, it is essential for the convergence of the method that good initial values are prescribed. In order to achieve this, it is possible at first to check which bounding box is impinged by the beam, and in the case where the bounding box only encloses a single surface fragment, i.e. constitutes a leaf node, the centre values of that mesh of the grid which is formed by the enclosed surface fragment are used as initial values for the iteration. The centre values are those values that form the centre of the corresponding mesh.

In one embodiment variant of the method according to the invention, the freeform surface can be subdivided such that one surface fragment is approximately imaged on one pixel in the image plane. By way of example, if the image plane has a pixel resolution of 1024×786 (XGA), such a resolution can also be used for subdividing a screen-filling freeform surface.

In an alternative embodiment variant, the subdivision can be brought about dependent on the distance of the freeform surface from the virtual camera, wherein the subdivision becomes finer as the distance decreases. Here, in a simple case, a boundary distance may be defined such that a first subdivision, e.g. 1024×1024, is used below this boundary distance and a second subdivision that is less than the first subdivision, for example 512×512, is used above this boundary distance. In an advantageous development of this procedure, it is also possible for a plurality of boundary values to be defined in a step-like fashion, wherein the subdivision is selected dependent on the two boundary values between which the distance is situated. Finally, use can also be made of a direct functional, e.g. linear, dependence between distance and subdivision.

As an alternative to a distance-dependent subdivision, or cumulative thereto, the subdivision of the freeform surface can be brought about dependent on the size of the rendering of the freeform surface on the image plane, wherein the subdivision becomes finer as the size of the rendering increases. Thus, the size of the rendering of the freeform surface on the image plane, i.e. the number of pixels on which the surface is imaged, can be exclusively taken into account for the degree of subdivision, or this can be taken into account in addition to distance between the surface and the camera.

The size of the rendering can for example be determined by a perspective projection of the freeform surface on the image plane, with the number of pixels covered by the projection being determined.

Alternatively, the size of the rendering can be determined by a perspective projection of a bounding box, which completely encloses the freeform surface, on the image plane, with the number of pixels covered by the projection being determined. This can in turn be brought about such that the eight vertices of a cuboid bounding box around the freeform surface are projected onto the image plane such that eight 2D points are created on the image plane, which can be surrounded by a bounding surface, e.g. a rectangular so-called "axis aligned 2D bounding box". The surface of this bounding surface supplies the estimated number of pixels that the freeform surface assumes on the image plane.

A maximum subdivision in each of the directions of the two parameters (u, v) is preferably a power of 2. By way of example, it can be between 512 and 2048, preferably 1024.

In an advantageous development of the method according to the invention, an item of information can be stored for each freeform surface, which item of information relates to when said freeform surface, or a bounding box enclosing it, was last impinged by a beam. This information is advantageous in that the age and the importance of a surface can be taken into account and the subdivision of the surface can accordingly be selected in a memory-saving fashion.

Thus, for example, the current subdivision of a freeform surface can be replaced by a coarser subdivision if a specific predeterminable period of time T1 has passed since the last beam impinged. By way of example, this would be the case if a surface of an object passes into the background, i.e. becomes covered by other surfaces situated in front of it, such that it is no longer or only partly visible. In this case it is expedient to reduce the subdivision of the surface in order to save memory as a result of this. This can be brought about by "switching" to a coarser subdivision after the period of time has elapsed.

In another alternative embodiment variant, the subdivision of a freeform surface can be replaced by a coarser subdivision dependent on the period of time that has passed since the last beam impinged, wherein the subdivision becomes coarser as the period of time increases. Compared to switching after the period of time has elapsed, the subdivision can in this variant become successively coarser as the time during which the surface is not once again impinged by a beam passes, and so memory is increasingly saved. By contrast, if the surface is once again impinged by a beam, the subdivision is brought about as per the aforementioned criteria, i.e. as per a fixedly predetermined subdivision for example, dependent on the distance between the surface and the camera and/or taking into account the size of the surface on the image plane.

As an alternative to a reduction in the subdivision, all information stored in respect of the surface can be deleted after a period of time T2 has elapsed since the last beam impinged on the surface. The period of time T2 can be selected to be the same as the aforementioned period of time T1. However, it may also be longer. Thus, for example, the first-mentioned period of time T1 can be between one and a few seconds and the second period of time T2 can be between one and a number of seconds.

As an alternative to time-triggered activation of a change in the fineness of the subdivision or deleting the information stored in respect of a surface, or in combination with these, memory-triggered activation can be implemented. If a certain predeterminable memory upper limit is reached there can preferably be a reduction in the subdivision of those freeform surfaces in which a specific predeterminable period of time has passed since the last beam impinged. Likewise, if a certain, preferably the same, predetermined memory upper limit is reached there can be a deletion of those freeform surfaces in which a specific predeterminable period of time has passed since the last beam impinged or in which the last beam impingement was furthest back in time. This cleans up the memory which is in the process of reaching a certain limit, a so-called memory bound, and clears freeform-surface related data that is at this moment in time no longer required therefrom.

The presented method is implemented as a computer program, wherein the program contains instructions for carrying out the method if it is executed on a computer system. Finally, the program may be stored on a data medium, from which the instructions of the program can be loaded onto a computer system and can be executed on said computer system.

Further features, advantages and properties of the method according to the invention will be described on the basis of the following description of concrete exemplary embodiments, with reference to the attached drawings. However, reference is made to the fact that the invention is not restricted to these embodiment variants. Rather the invention also comprises developments that emerge in an obvious fashion for a person skilled in the art from the features according to the invention illustrated here.

DETAILED DESCRIPTION

FIG. 1 shows a schematic illustration of the ray tracing principle for synthesizing a scene 5 as an image, for example with a resolution of 512×512 pixels 3. For simplicity, only 5×5 pixels 3 are illustrated in an image plane in FIG. 1. Here, virtual beams 2 are sent from a virtual camera 1 into a three-dimensional scene 5 through the pixels 3 in the virtual image plane 4, and said beams are made to intersect with the scene 5. At the intersections 10, illumination information and, from this, a color is determined and assigned to the respective pixel 3. Three beams 2 have been drawn in FIG. 1 in an exemplary fashion, which beams pass through three of the pixels 3 and impinge on the left sidewall, the floor of the scene 5 and on an object 9. Optionally further beams (not drawn in FIG. 1), so-called secondary beams, are emitted starting from the intersections 10, for example in order to simulate mirroring in or transparency of a surface. Those beams 2 that originate from the camera 1 and intersect a pixel 3 in the image plane 4 are referred to as primary beams. The term "secondary beams" refers to all beams that are not primary beams.

An object 9 in the form of a sports car is illustrated in the scene 5, with the object consisting of a number of freeform surfaces. The freeform surfaces are described by NURBS equations and form corresponding NURBS surfaces. One of these NURBS surfaces describes the surface of the engine bonnet of the sports car 9 and is provided with the reference sign 6.

NURBS surfaces belong to the category of freeform surfaces and, as a result of their characteristics, are well suited to render arced surfaces, such as e.g. a ship's hull or aeroplane's fuselage or said engine bonnet of the sports car 9. The equation describing the NURBS surface 6 is dependent on two parameters u, v. These parameters u, v can be understood as coordinates in a two-dimensional space that is spanned by the parameter directions in which the parameter values u, v increase. This space is referred to as a parametric 2D space or else as a parametric domain, wherein the parameters u, v define the coordinate axes of this space. Selecting the two parameters u, v uniquely determines a 3D point that lies on the surface 6. Thus, all points on the surface, and hence the surface 6 itself, are obtained by inserting all possible u and v parameters into the NURBS equation.

The two parametric directions have a specific degree (>=1) and a so-called knot vector, and also a number of control points in the 3D or homogenous 4D space. The valid values for u and v emerge from these two knot vectors that are used in addition to the NURBS equation for describing the surface. A knot vector is always a monotonically increasing number chain with precisely that amount of numbers as the sum of the degree+1 and the number of control points. By way of example, the number chain [0 0 0 0 1 2 34444] is a valid knot vector for a third degree curve, i.e. for one parameter direction, and 7 control points, and has a validity range between 0 and 4. The mathematical description of NURBS surfaces is sufficiently well known from the prior art. A detailed presentation of the description of NURBS surfaces is provided in O. Abert, 2009, "Augenblick—Ein effizientes Framework fur Echtzeit Ray Tracing" ["Snapshot—an efficient framework for real-time ray tracing"], EUL Verlag [publishers], ISBN 978-3-89936-847-5, pages 129 ff.

FIG. 2 shows an enlargement of the scene 5 from FIG. 1. In this illustration, the NURBS surface 6 is subdivided into surface fragments 7 this is the English terminology—in the three-dimensional space by means of a grid, with the grid having its origin in the parameter space. The grid here merely serves for visualization purposes. The formation of the grid is explained below on the basis of a comparison to the prior art. Moreover, a bounding box 17—this is the English terminology—in the form of a cuboid bounding box 17 has been drawn around the surface 6 and completely encloses the surface 6. The bounding box 17 also merely serves for visualization purposes. In order to use bounding boxes that enclose surfaces or surface fragments, these bounding boxes should be aligned with the coordinate axes of the three-dimensional space, the so-called world coordinate system. This principle makes the intersection calculation easier and is known by the term "axis aligned bounding box".

Figure 3:
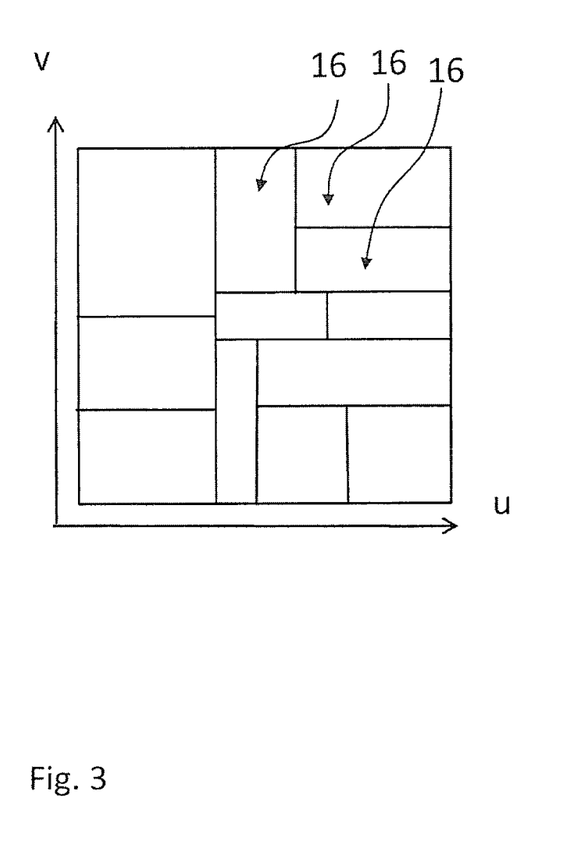
FIG. 3 shows an irregular subdivision of the parametric domain of a NURBS surface.

In order to calculate the intersections, use is made of a multi-dimensional Newton-iteration method in order to numerically approximate an intersection 10 between NURBS surface 6 and beam 2. To this end, initial values are required for staring the iteration and ensuring reliable convergence. In order to determine the initial values in the prior art, the parametric two-dimensional domain of the NURBS surface is decomposed into regions 16 (see FIG. 3) such that these regions 16 define approximately planar surface fragments of the NURBS surface in the three-dimensional space for the parameter ranges defined by the boundaries of a region 16. This is brought about by a "normal criterion", which scans the surface of the NURBS surface at specific points and compares the normals thereof to one another in order to determine whether the surface has a strong curvature or is rather flatter. If the curvature is above a definable threshold, the region 16 is divided into two new sub-regions and the method is applied recursively. The subdivision is always effected at the parametric centre of the respective parametric direction u, v that has a larger extent in the Cartesian parameter space. This results in an irregular subdivision of the parametric space, which is spanned by the two parameter directions u, v, into regions 16, as illustrated in FIG. 3.

According to the prior art, every surface fragment needs to be stored in a data structure requiring 64 bytes of memory. Additionally, an axis aligned bounding box, which in turn requires 32 bytes of memory, is placed around each surface fragment. In order to construct an acceleration data structure around the surface fragments or around the bounding boxes such that the number of intersection tests can be reduced and hence the calculation process can be accelerated, further bounding boxes are required, which comprise the bounding boxes enclosing an individual surface fragment. This once again requires memory. For the totality of the bounding boxes of the acceleration data structure, another 32 bytes are required per surface fragment, and so 96 bytes of memory are required per fragment—without taking into account the hierarchy built up over it. The present invention enables a significant reduction in this memory requirement.

Figure 4:
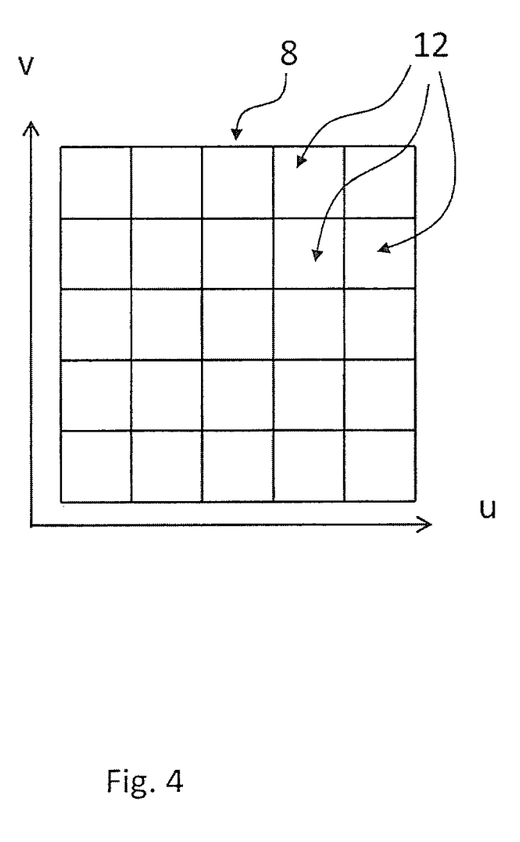
FIG. 4 shows a regular subdivision of the parametric domain of a NURBS surface.

The solution presented here starts at the point of the parametric division of the NURBS surfaces. The irregular subdivision according to FIG. 3 is abandoned in favor of a regular subdivision according to FIG. 4. FIG. 4 shows a regular subdivision of the NURBS surface 6 in the direction of the two parameters u, v, and so the surface fragments 7 form meshes 12 of a two-dimensional grid 8 of the NURBS surface 6 in the parameter space. Although this approach tends to require overall a greater number of surface fragments 7 in absolute terms, the relevant information in respect of the individual surface fragments 7 can be stored very much more efficiently in this case since the fragments 7 themselves require no additional memory, as will become clear below.

Figure 5:
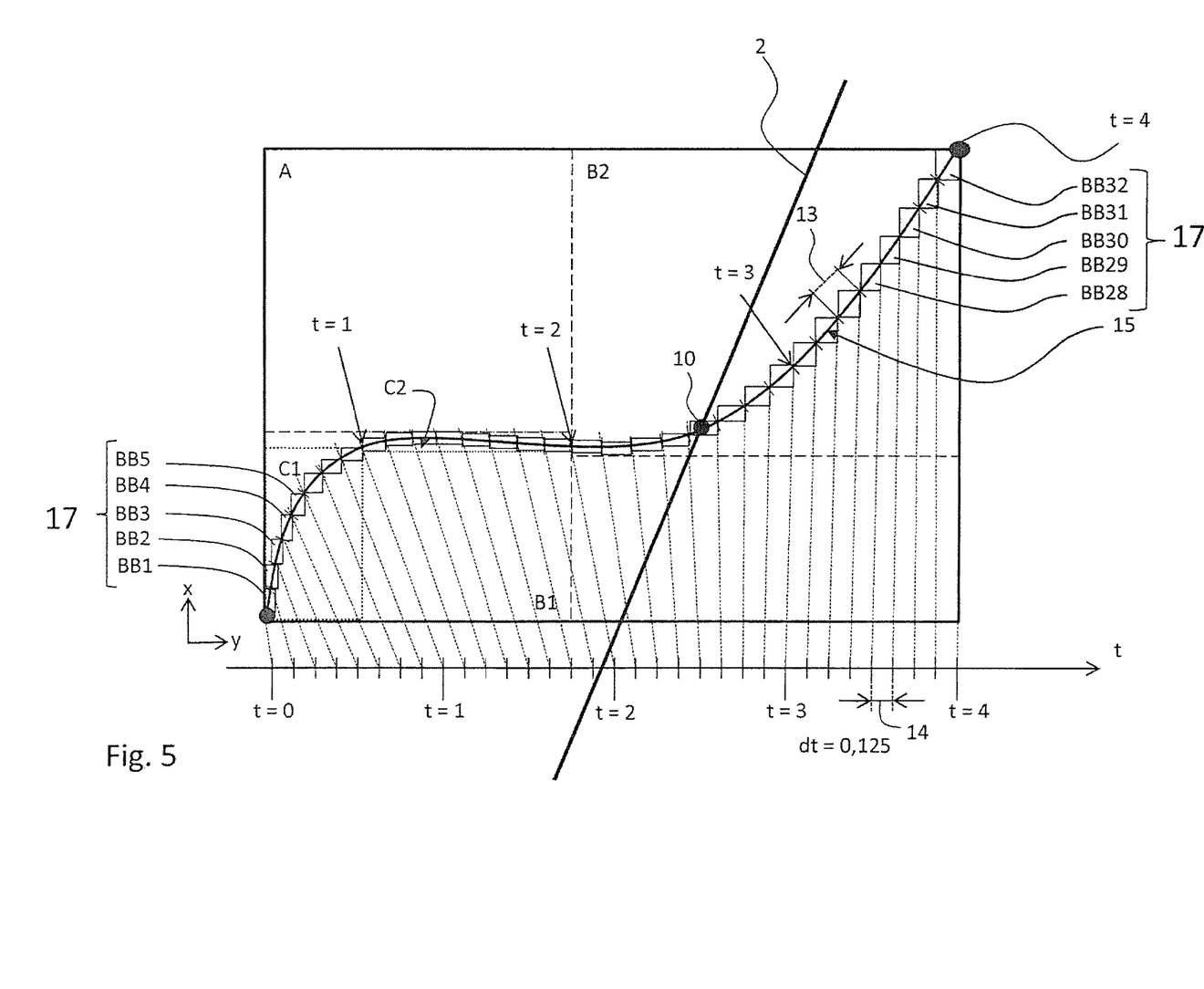
FIG. 5 shows a visualization of the subdivision of the parametric domain on the basis of a freeform curve.

FIG. 5 shows a freeform curve 15 for visualizing the subdivision according to the invention in the 2D space that is spanned by the coordinate axes x, y. The curve 15 is described by a parametric curve equation with the parameter t, which has values in the range between t=0 and t=4. The one-dimensional illustration of the parameter direction t as a straight line is reproduced under the curve display. This straight line as it were forms the parametric domain of the freeform curve 15. Within the defined range of the parameter t, the freeform curve 15 is subdivided in a regular fashion into 32 parameter sections 14, which leads to a division of the freeform curve 15 into 32 corresponding curve sections 13. It follows that the parameter sections 14 all have the same length dt=0.125, and so the subdivision in the parameter direction t is equidistant. By contrast, the curve sections 13 by no means have the same length in the 2D space.

A bounding box 17, aligned along the coordinate axes x, y (axis aligned bounding box), is placed around each curve section 13. This results in 32 bounding boxes, numbered BB 1 to BB32. An acceleration data structure is placed over the curve sections 13 or over the bounding boxes 17 in order to be able to determine where the intersection 10 between a beam 2 and the freeform curve 15 is situated with little computational complexity; according to this acceleration data structure, all bounding boxes 17 are ordered as nodes in a hierarchy, wherein those nodes that only enclose a single curve section 13 are referred to as leaf nodes because they are situated at the end of the hierarchy.

Figure 6:
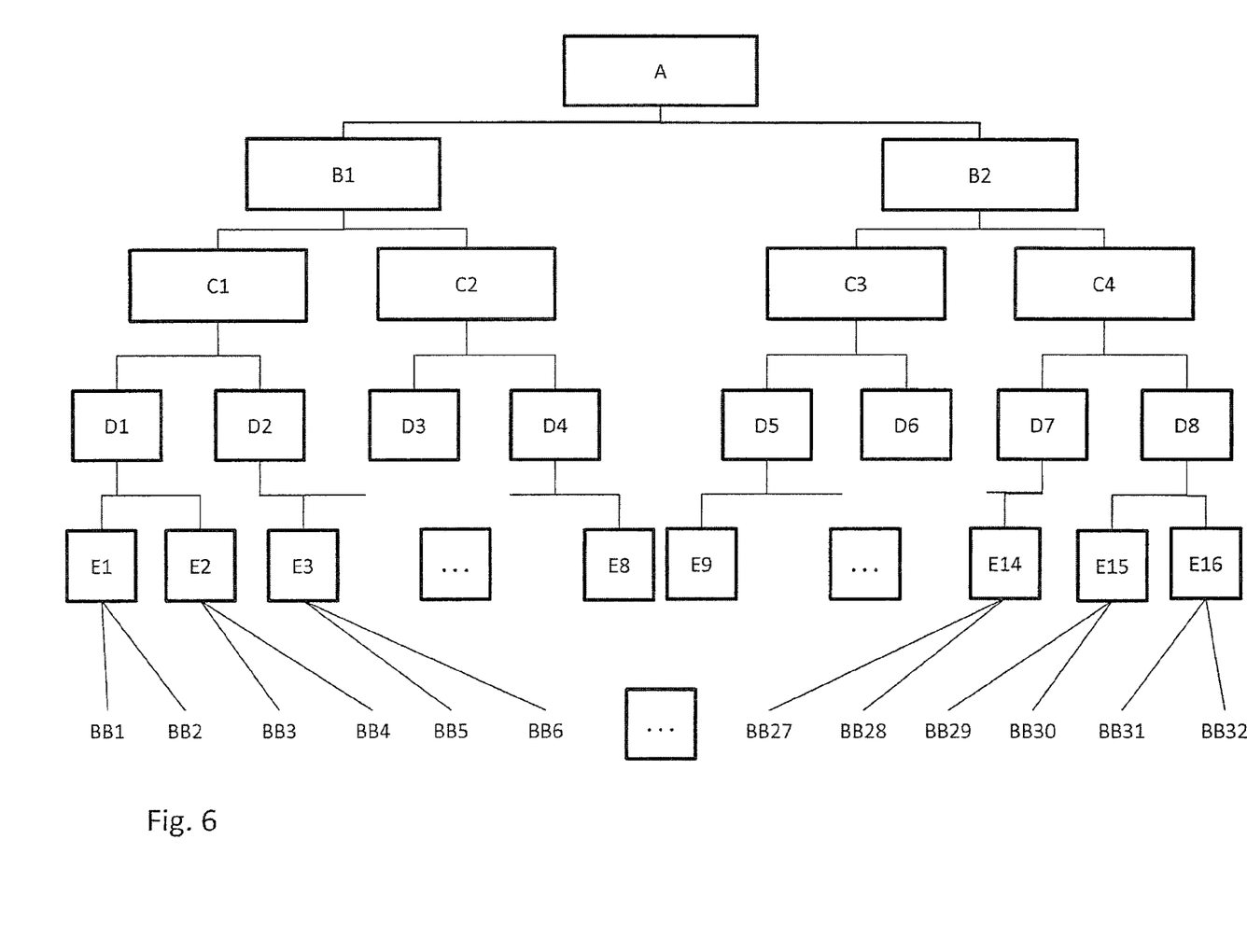
FIG. 6 shows a hierarchic structure of the acceleration data structure.

The acceleration data structure is generated starting from a root node A, which encloses the entire curve 15. All bounding boxes 17 are then successively divided in an equal fashion such that two new bounding boxes are created in each case, which always have a similar number of "sub-bounding boxes". Thus, the first bounding box B1 ordered under the root node A contains the leaf nodes BB1 to BB16; the second bounding box B2 ordered under the root node A contains the leaf nodes BB 17 to BB32. The bounding box B1 is thereupon divided into two bounding boxes C1, C2, wherein the first bounding box C1 comprises the leaf nodes BB1 to BB8 and the second bounding box C2 comprises the leaf nodes BB9 to BB 16. This division is repeated until each inner node only comprises two leaf nodes. The acceleration data structure emerging as a result of this is illustrated schematically in FIG. 6.

As a result, it is not necessary to subject each of the 32 curve sections 13 to an intersection test in order to determine the intersection 10 of the beam 2 with the curve 15 in FIG. 5. Rather, the bounding box A is firstly tested to determine whether the beam 2 runs past the freeform curve 15. If this is not the case, bounding box B1 is then tested. Since this test is negative, bounding box C3 is subsequently tested since it is clear that bounding box B2 is impinged. This test (C3) is positive, and so only bounding boxes BB17 to BB24 come into question for having an intersection 10. This is then followed by an intersection test with the bounding box D5—this has a negative result—and then there is a test using the first bounding box that is a child of D6, i.e. using bounding box E11. This test is positive, and so only BB21 or BB22 are still possible. An intersection test with BB21 is positive. Since BB21 is a leaf node, the procedure is followed by determining the intersection 10 by means of a Newton iteration method. The centre of that parameter section 13 that defines the boundaries of the curve section 14 that is surrounded by the bounding box BB21 is used as initial value. The parameter section 13 lies between the boundaries t=2.5 and t=2.625. Accordingly, the initial value is t=2.5625.

The illustrated method is accordingly applied in a two-dimensional parameter space u, v in order to determine the intersection of a beam 2 with a freeform surface 6. The curve sections 13 then correspond to the surface fragments 7 of the surface 6 and the parameter sections 14 correspond to the meshes 12 of the grid 8. The parametric values, which are bounded by a mesh 12 and describe the individual surface fragments 7, can be calculated from the grid 8, and so there is no need to store the surface fragments 7 separately. All that is required is memory for the bounding boxes 17 and the hierarchy defined over this.

The subdivision of grid 8 is determined first. More memory is used as the grid becomes finer, but the geometric rendering of the scene 5 becomes more precise. If a surface 6 is observed from a great distance, a very coarse subdivision suffices. By contrast, if it is observed from very close up, for example in a screen-filling fashion, the subdivision must be correspondingly fine to avoid image errors. This realization led to the recommendation of taking into account the size of a surface 6 on the screen, i.e. on the image plane 4.

To this end, the surface 6 is projected onto the image plane 4 in a perspective fashion, i.e. in accordance with the currently utilized virtual camera 1. This is brought about by virtue of the fact that the bounding box 17 that completely encloses the surface is projected onto the image plane 4, with the number of pixels 3 covering the projection being determined. To this end, the eight vertices of the bounding box 17 are projected onto the image plane 4 such that eight 2D points are created on the image plane 4, which 2D points are enclosed by a rectangular axis aligned 2D bounding box.

The area of this bounding box supplies the estimated number of pixels 3 that the NURBS surface 6 occupies on the image plane 4. Here, the fact that one surface fragment 7 should be approximately imaged on one pixel 3 in the image plane 4 holds true as a basis for determining the subdivision of the grid 8.

Figure 7:
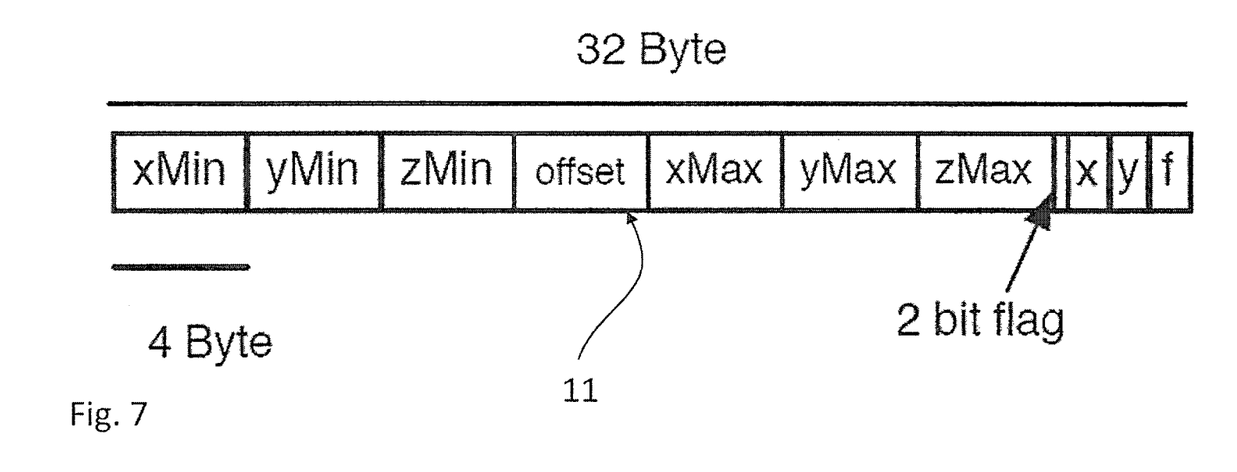
FIG. 7 shows a data structure of a bounding box.
Figure 8:
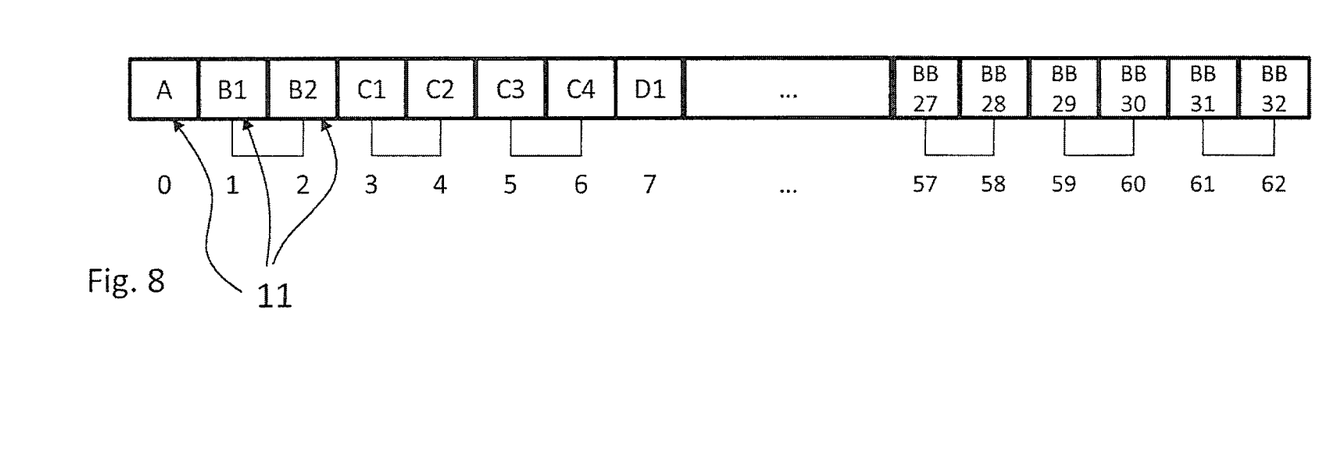
FIG. 8 shows an illustration of the data structures in the main memory.

FIG. 7 shows a schematic illustration of a data structure 11 for storing a bounding box 17. The data structure 11 comprises 32 bytes of memory. Of this, 6*4 bytes are required as integers for the 3D coordinates of the minimum vertex x_min, y_min, z_min and the maximum vertex x_max, y_max, z_max of the bounding box 17. In the case of the acceleration data structure, it is necessary to store a pointer to the first of its children in the case of an inner node. FIG. 8 shows the storage sequence of the data structures 11 in the main memory. The storage is effected in a row, with children always being situated next to one another and an index running from 0 to 62 being used for the purpose of identifying the storage location for the individual data structures 11 of the 63 bounding boxes 17 according to the example in FIG. 6. This index can be used as a pointer, and is contained in the data structure 11 from FIG. 7 as an offset with 4 bytes. A 2 bit flag stores status flags, which are unimportant in this context.

An essential aspect of the invention relates to storing the position of a surface fragment 7 on the surface 6 on the basis of the grid coordinates in the data structure 11 of the bounding box enclosing this surface fragment 7. To this end, respectively 10 bits are used in the data structure 11 for the coordinate x in the first parameter direction u and for the coordinate y in the second parameter direction v. This means that the two parameter coordinates u, v can each at most be subdivided into 1024 ($=2^{10}$) sections because this is wholly sufficient and allows efficient storage. It follows that a total of 2D bits is required for the grid coordinates x, y. The grid coordinates x, y then specify the position of a surface fragment 7 in the grid 8. The last 10 bits (f) remain unused.

According to the invention, the same data structure according to FIG. 7 is used for the leaf nodes and for the inner nodes in order to ensure uniform processing in the software. However, since inner nodes do not enclose an individual surface fragment 7, the 2×10 bits for the grid coordinates x, y are not required in this case. It follows that 30 bits remain free in this case. Moreover, the leaf nodes do not require an offset since these nodes do not have children to which references must be provided. This means that 4 bytes and 10 bits are free in that case. The corresponding bits remain unused in the data structure 11. The free bits can be used to store further information or to increase the subdivision of the surface 6, such that 11 or 12 bits are used per grid coordinate 11 instead of 10 bits.

By contrast, if two full integer values at 32 bits were used for storing the position, the size of a data structure for a bounding box 17 would grow to 36 bytes, which is disadvantageous for memory alignment since the arrangement in terms of addresses divisible by 16 is advantageous for efficient cache handling.

While a leaf bounding box, i.e. a bounding box at the end of the hierarchy without any own bounding boxes as children, stores a 4 byte long offset to a surface fragment in the prior art, it is only an x and y coordinate for specifying the position of a surface fragment 7 in the grid 8 of the parametric domain of the surface 6 that is stored in the proposed method. The parametric range bounded by the corresponding mesh 12 of the grid can then be uniquely constructed from this information. This is illustrated in FIG. 9.

Figure 9:
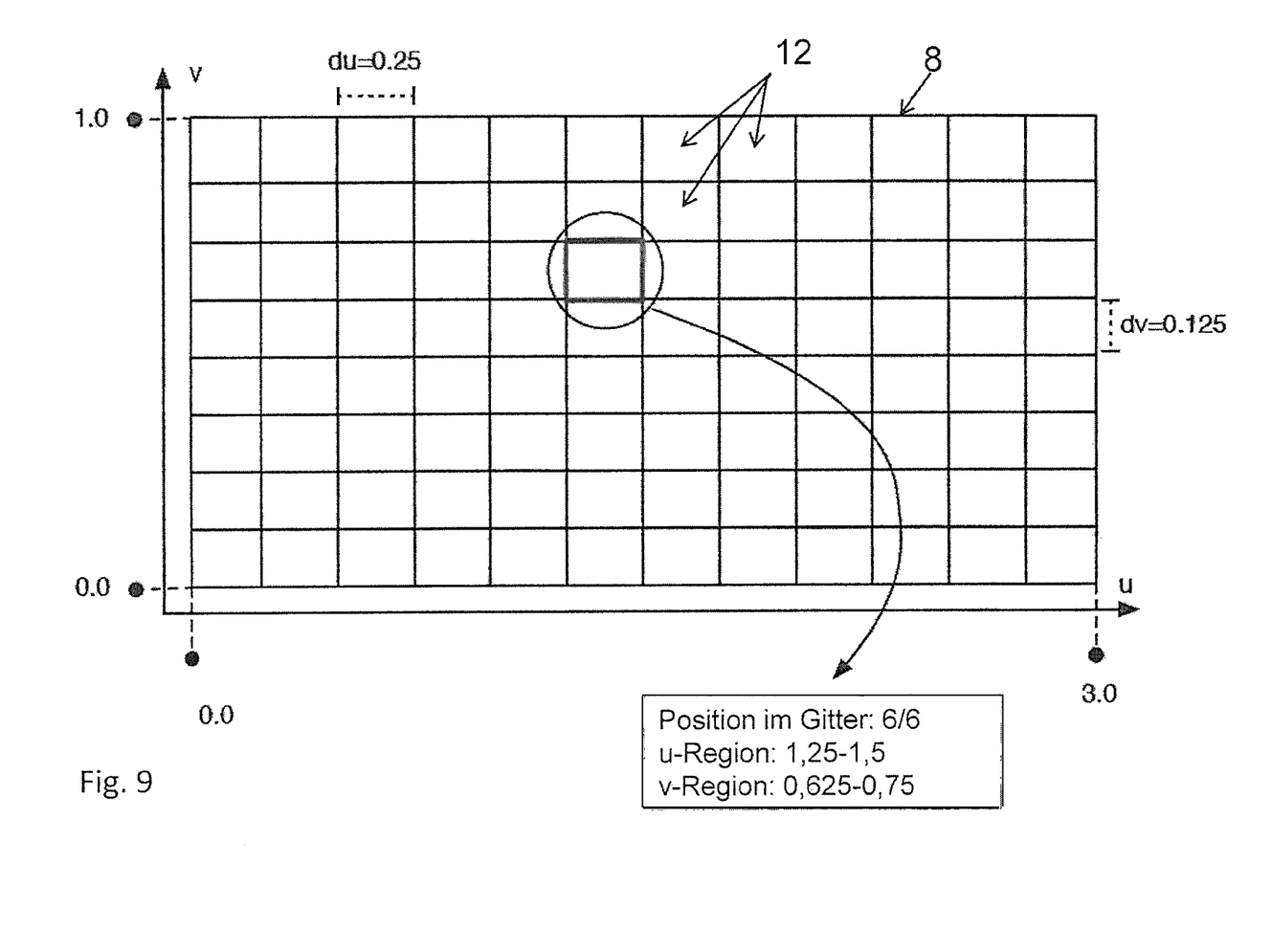
FIG. 9 shows a grid with determining the parameter ranges for a surface fragment on the basis of the grid position.

FIG. 9 shows a grid 8 with meshes 12, which is formed by dividing the first parameter direction u into 12 parameter sections and by dividing the second parameter direction v into 8 sections. The range for the parameter u of the first parameter direction lies between 0 and 3, and so the parameter sections have a length du=0.25. By contrast, the range for the parameter v of the second parameter direction lies between 0 and 1, and so the parameter sections have a length dv=0.125. This characterizes a mesh 12 over the grid coordinates 6/6, i.e. x=6 and y=6, in FIG. 9, which specifies the position of a surface fragment 7 on the surface 6 in the 3D space by parameter value limits. These emerge from the fact that the mesh 12 delimits the parameter space to 1.25-1.5 in the u direction and to 0.625-0.75 in the v direction. The initial value for the Newton iteration thus emerges from the enclosed parametric domain, described by the respective minimum and maximum values. The mean value is formed from these and used as initial value, i.e. u_start=1.375 and v_start=0.6875 in the present case.

Since the subdivision is restricted to 1024, i.e. to 10 bits, only 20 bits are required for x and y. Further information such as a pointer to the surface, material information, etc., are not required here because the association of a surface fragment 7 to the corresponding surface 6 is already known, and all additional information has been stored there. The memory usage for the subdivision therefore improves from N*64 bytes, where N is the number of surface fragments for the irregular subdivision according to the prior art, empirically approximately 1000 to 10 000 per surface, to merely constant 20 bits for storing the subdivisions of both parametric directions u, v. The memory requirement for the acceleration data structure, i.e. for the additional bounding boxes that form the inner nodes, remains the same compared to the prior art, but the above-described savings are already significant. Depending on the scene, approximately 15-20% of the overall memory can be saved.

However, this proposed storage of grid coordinates for referencing surface fragments in the data structure of the bounding boxes still has an additional significant advantage. While the heuristics according to the prior art is relatively complex and computationally intensive, the novel method is significantly faster in terms of the calculation, and so the preparation of an individual NURBS surface 6 can now be measured in microseconds or a few milliseconds. Hence, for the first time this allows the real-time use, i.e. not during a complex pre-processing step as previously, but during the runtime. It directly follows that this allows a further significant improvement in respect of memory usage in conjunction with the following measure:

In accordance with the prior art, NURBS surfaces were subdivided during pre-processing such that they could withstand the worst-case scenario. This means that the subdivision was generally fine enough that it is also possible to observe a surface from extremely close up. The subdivision must become finer as the size of an image of a surface increases in order to permit an artifact-free image. An adaptive solution, i.e. the calculation of a new subdivision depending on the actual distance from the virtual camera, could not be realized previously in a real-time system because the recalculation was too slow and would have gravely threatened the interaction. However, this is now possible thanks to the approach described here.

Every surface is checked at certain time intervals. An interval of one second was found to be expedient. Time information relating to when it was last impinged by a beam is stored with each surface. Every time a surface should in actual fact be tested against a beam, and the last test was more than a second ago, a test is carried out as to whether there was a significant change in the camera position, i.e. the distance between camera and surface. If this is the case, there is an increase or else a reduction in the subdivision, i.e. if the distance increases a coarser subdivision is selected and if the distance decreases a finer subdivision is used.

Furthermore, surfaces that have not been impinged by a beam for a very long time, for example because they now lie on the rear side of an object and are therefore no longer visible or because they never were visible since they are enclosed by another surface, obtain a very, very coarse subdivision. If a predetermined period of time of e.g. one or a few seconds since the last beam impingement is exceeded, the data in respect of a corresponding surface is deleted.

The surface coverage on the screen plane plays an essential role for the subdivision. A surface that would be imaged on a few pixels requires a less fine subdivision than one that covers more than 100 000 pixels. In this fashion, only very few surfaces need to obtain a fine subdivision, while a medium or even a coarse subdivision is sufficient for a multiplicity of surfaces. This leads to further significant memory-savings, and so scenes merely require approximately a quarter of the original memory.

Building on the aforementioned improvements, there is a further option for saving memory as a direct consequence thereof. Along with the reconstruction of the subdivisions during the runtime and the deletion of no longer required surfaces, there is the option of equipping the method with a memory bound. This means that it is possible to set an upper limit of main memory that may not be exceeded by the method. Whenever the limit, e.g. 24 GB, is reached, subdivisions of surfaces that have not been needed for a long time are replaced by a low resolution subdivision.

In the worst case scenario, if the upper memory bound was selected to be too low, it may be the case that individual surfaces are repeatedly recalculated at runtime because all desired subdivisions for an individual image do not fit into the memory region. However, this is not a fundamental problem because this merely adversely affects the execution speed. The greater the missing amount of memory is, the slower the execution becomes. Such a method for the first time allows the efficient execution of the method, independently of the actually available memory.

The methods according to the prior art would allocate the required amount of memory and, should this prove to be insufficient, would swap it onto the hard-disc drive as so-called virtual memory. In any case this is much slower than the method present here.

Combining the two ideas, i.e. the efficient storage of the surface fragments as grid coordinates in the data structure of the bounding boxes and the distance or image-size dependent subdivision of a surface, results in reductions in the memory usage by 70% to 80% with unchanging quality and speed of the visualization method.

LIST OF REFERENCE SIGNS

1 Virtual camera
2 Virtual beam
3 Pixel
4 Virtual image plane
5 Scene
6 Freeform surface, NURBS surface
7 Surface fragments
8 Grid
9 Object
10 Intersections 11 Data structure of a bounding box
12 Mesh
13 Curve section
14 Parameter section
15 Freeform curve
16 Irregular parametric regions
17 Bounding box

The invention claimed is:

1. A method for visualizing freeform surfaces defined via one or more non-uniform relative B-spline (NURBS) surfaces, the method comprising:
subdividing a first freeform surface in a first parameter direction at a first regular interval and in a second parameter direction at a second regular interval to define a plurality of surface fragments that forms a mesh grid, wherein the first parameter and the second parameter define a parametric space, each of the plurality of surface fragments is enclosed by at least one bounding box, the first freeform surface is defined by at least one NURBS surface and is associated with an object in a graphics scene, and each point residing on the first freeform surface corresponds to a unique combination of a first parameter value and a second parameter value;
emitting a virtual beam into the scene from a virtual camera, wherein the beam passes through a pixel included in a virtual image plane and intersects a first surface segment of the first freeform surface;
determining, by traversing each of a plurality of bounding boxes that each encloses the first surface segment, an intersection point residing within the first surface fragment where the beam intersects the first freeform surface, wherein the plurality of bounding boxes includes a first bounding box, a second bounding box, and a third bounding box, the first bounding box comprising (i) the second bounding box and (ii) a fourth bounding box that is not included in the plurality of bounding boxes;
calculating an illumination value at the intersection point; and
assigning the illumination value to at least one pixel included in the virtual image plane.

2. The method of claim 1, wherein the second bounding box comprises the third bounding box and a fifth bounding box, and determining the intersection point between the beam and the first freeform surface comprises determining that the beam intersects the first bounding box, determining that the beam intersects the second bounding box, but not the fourth bounding box, and determining that the beam intersects the third bounding box, but not the fifth bounding box.

3. The method of claim 1, further comprising storing in memory each bounding box that encloses at least one of the plurality of surface fragments, but not storing in memory the plurality of surface fragments.

4. The method of claim 1, further comprising generating an acceleration data structure that stores a node hierarchy, wherein each bounding box that encloses at least one of the at least one surface fragments comprises a node in the node hierarchy, and each bounding box that encloses only one of the at least one surface fragments comprises a leaf node in the node hierarchy.

5. The method of claim 1, wherein each of the bounding boxes associated with the plurality of surface fragments is aligned to boundaries of the corresponding surface fragment.

6. A non-transitory computer-readable storage medium storing instructions that, when executed by a processor, cause the processor to perform an operation for visualizing freeform surfaces defined via one or more non-uniform relative B-spline (NURBS) surfaces, the operation comprising:
subdividing a first freeform surface in a first parameter direction at a first regular interval and in a second parameter direction at a second regular interval to define a plurality of surface fragments that forms a mesh grid, wherein the first parameter and the second parameter define a parametric space, each of the plurality of surface fragments is enclosed by at least one bounding box, the first freeform surface is defined by at least one NURBS surface and is associated with an object in a graphics scene, and each point residing on the first freeform surface corresponds to a unique combination of a first parameter value and a second parameter value;
emitting a virtual beam into the scene from a virtual camera, wherein the beam passes through a pixel included in a virtual image plane and intersects a first surface segment of the first freeform surface;
determining, by traversing each of a plurality of bounding boxes that each encloses the first surface segment, an intersection point residing within the first surface fragment where the beam intersects the first freeform surface, wherein the plurality of bounding boxes includes a first bounding box, a second bounding box, and a third bounding box, the first bounding box comprising (i) the second bounding box and (ii) a fourth bounding box that is not included in the plurality of bounding boxes;
calculating an illumination value at the intersection point; and
assigning the illumination value to at least one pixel included in the virtual image plane.

7. The non-transitory computer-readable storage medium of claim 6, wherein the second bounding box comprises the third bounding box and a fifth bounding box, and determining the intersection point between the beam and the first freeform surface comprises determining that the beam intersects the first bounding box, determining that the beam intersects the second bounding box, but not the fourth bounding box, and determining that the beam intersects the third bounding box, but not the fifth bounding box.

8. The non-transitory computer-readable storage medium of claim 6, further comprising storing in memory each bounding box that encloses at least one of the plurality of surface fragments, but not storing in memory the plurality of surface fragments.

9. The non-transitory computer-readable storage medium of claim 6, further comprising generating an acceleration data structure that stores a node hierarchy, wherein each bounding box that encloses at least one of the at least one surface fragments comprises a node in the node hierarchy, and each bounding box that encloses only one of the at least one surface fragments comprises a leaf node in the node hierarchy.

10. The non-transitory computer-readable storage medium of claim 6, wherein each of the bounding boxes associated with the plurality of surface fragments is aligned to boundaries of the corresponding surface fragment.

11. A computer system, comprising:
a memory storing one or more programs; and
a processor coupled to the processor and configured to perform an operation for visualizing freeform surfaces defined via one or more non-uniform relative B-spline (NURBS) surfaces, the operation comprising:

subdividing a first freeform surface in a first parameter direction at a first regular interval and in a second parameter direction at a second regular interval to define a plurality of surface fragments that forms a mesh grid, wherein the first parameter and the second parameter define a parametric space, each of the plurality of surface fragments is enclosed by at least one bounding box, the first freeform surface is defined by at least one NURBS surface and is associated with an object in a graphics scene, and each point residing on the first freeform surface corresponds to a unique combination of a first parameter value and a second parameter value;

emitting a virtual beam into the scene from a virtual camera, wherein the beam passes through a pixel included in a virtual image plane and intersects a first surface segment of the first freeform surface;

determining, by traversing each of a plurality of bounding boxes that each encloses the first surface segment, an intersection point residing within the first surface fragment where the beam intersects the first freeform surface, wherein the plurality of bounding boxes includes a first bounding box, a second bounding box, and a third bounding box, the first bounding box comprising (i) the second bounding box and (ii) a fourth bounding box that is not included in the plurality of bounding boxes;

calculating an illumination value at the intersection point; and assigning the illumination value to at least one pixel included in the virtual image plane.

12. The computer system of claim 11, wherein the second bounding box comprises the third bounding box and a fifth bounding box, and determining the intersection point between the beam and the first freeform surface comprises determining that the beam intersects the first bounding box, determining that the beam intersects the second bounding box, but not the fourth bounding box, and determining that the beam intersects the third bounding box, but not the fifth bounding box.

13. The computer system of claim 11, further comprising storing in memory each bounding box that encloses at least one of the plurality of surface fragments, but not storing in memory the plurality of surface fragments.

14. The computer system of claim 11, further comprising generating an acceleration data structure that stores a node hierarchy, wherein each bounding box that encloses at least one of the at least one surface fragments comprises a node in the node hierarchy, and each bounding box that encloses only one of the at least one surface fragments comprises a leaf node in the node hierarchy.

15. The computer system of claim 11, wherein each of the bounding boxes associated with the plurality of surface fragments is aligned to boundaries of the corresponding surface fragment.

\* \* \* \* \*